United States Patent [19]

Mowrey

[11] 3,753,490

[45] Aug. 21, 1973

[54] CARRY CASE FOR MAGNETIC DISCS

[75] Inventor: Albert V Mowrey, Canoga Park, Calif.

[73] Assignee: General Instrument Corporation, Hawthorne, Calif.

[22] Filed: June 24, 1971

[21] Appl. No.: 156,382

[52] U.S. Cl. .............................. 206/62 P, 206/52 F

[51] Int. Cl. .............................. B65d 85/02

[58] Field of Search .............. 206/52 F, 52 R, 62 P, 206/62 R

[56] References Cited

UNITED STATES PATENTS

| | | | |
|---|---|---|---|
| 3,570,661 | 3/1971 | Kersh | 206/52 R |
| 3,176,281 | 3/1965 | Pattison | 206/62 P |
| 3,307,688 | 3/1967 | Widmont, Jr. | 206/52 F |
| 3,341,001 | 9/1967 | Barclay et al. | 206/52 F |
| 3,349,898 | 10/1967 | Palson et al. | 206/52 F |
| 3,465,875 | 9/1969 | McKelvey, Jr. | 206/52 R |

*Primary Examiner*—William T. Dixson, Jr.
*Attorney*—Smyth, Roston & Pavitt

[57] ABSTRACT

A carry case for magnetic discs including a pair of interconnecting cover members forming an enclosed space and with the cover member supporting the magnetic disc therebetween within the enclosed space and with each cover member including a locking mechanism for engagement with a complementary locking portion on the magnetic disc so that the magnetic disc may be independently supported by each one of the cover members for insertion onto and removal from a drive spindle in a magnetic disc recording and reproducing machine.

7 Claims, 4 Drawing Figures

INVENTOR:
Albert V. Mowrey
By Smyth, Roston & Pavitt
ATTORNEYS

INVENTOR:
Albert V. Mowrey
By Smyth, Roston & Pavitt
ATTORNEYS

CARRY CASE FOR MAGNETIC DISCS

The present invention is directed to a carry case for a magnetic disc for use in a magnetic disc recording and reproducing machine. Specifically, the carry case of the present invention may be used to provide storage for the magnetic disc when the magnetic disc has been removed from the machine. In addition, each half of the carry case is used to support the magnetic discs for insertion onto and removal from a spindle member in the magnetic disc recording and reproducing machine. Each half of the carry case includes a quick-lock/unlock mechanism for simplified handling, storage and system operation.

Magnetic disc recording and reproducing systems are generally of two types. A first type includes a fixed position magnetic disc which does not allow for the magnetic disc to be easily removed. A second type of system does allow for magnetic discs to be interchanged within the machine so that a single machine is capable of recording and reproducing information on a plurality of magnetic discs.

The present invention is directed to a carry case for use with a magnetic disc which is to be inserted into and removed from a magnetic disc recording and reproducing machine. Since the magnetic discs are quite expensive, it is desirable to minimize the handling of the discs and also to minimize any contact with the recording surfaces of the discs. The carry case of the present invention thereby is designed to provide not only a convenient storage for the magnetic disc so that the disc is protected from damage, but also each half of the carry case is used for inserting the disc onto and removing the disc from the drive spindle of the magnetic disc machine. The carry case therefore provides a dual function by serving as a convenient tool for installing or removing discs and also for storing the discs when not in use.

The carry case of the present invention includes a pair of interconnecting cover members which are designed to support the magnetic disc therebetween in a position so that the recording surfaces of the magnetic disc are free floating and not in contact with the cover members. In addition, each cover member includes a locking mechanism for engaging a complementary locking portion of the magnetic disc. The locking mechanism includes a member having a plurality of spring fingers which are normally in retracted position. The spring fingers, however, may be activated outwardly by the operation of a locking actuator in each cover member so that the spring fingers enter a locking slot in the magnetic disc.

When it is desired to insert the magnetic disc on the drive spindle of the recording and reproducing machine, the appropriate one of the cover members of the carry case is unlocked and removed from engagement with the magnetic disc. The remaining one of the cover members is still locked to the magnetic disc so that the magnetic disc may be positioned using the remaining cover member. The remaining cover member which supports the magnetic disc is now used to place the magnetic disc on the drive spindle. All during this time, the recording surface of the magnetic disc has been free from any human contact so that the recording surface of the disc cannot be damaged. When the magnetic disc has been properly positioned on the drive spindle the remaining cover member is unlocked and removed so that the magnetic disc is in the proper position on the drive spindle.

A clearer understanding of the invention will be had with reference to the following description and drawings wherein.

Figures 1, 3, 4:
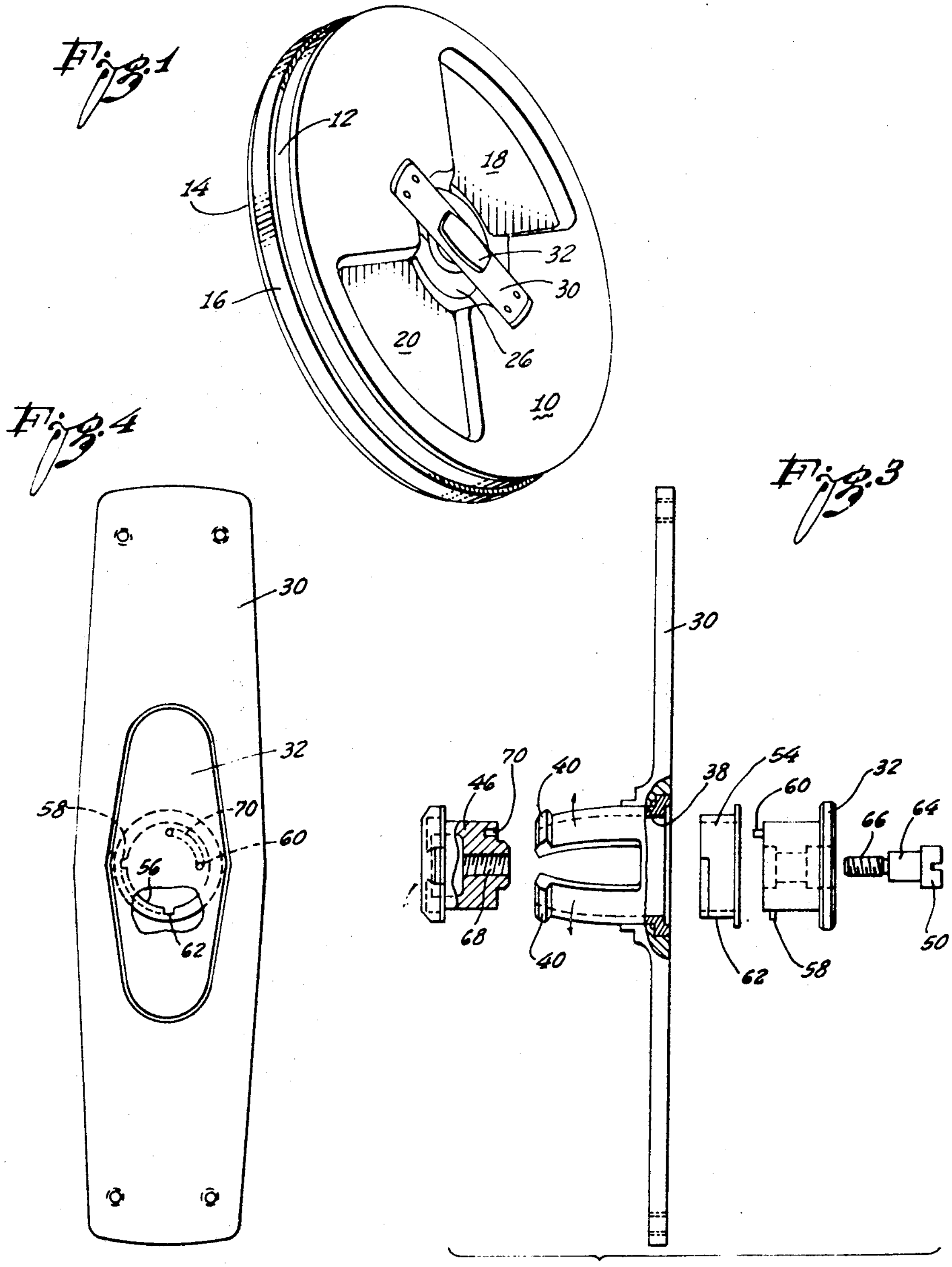
FIG. 1 illustrates a perspective view of the carry case of the present invention.
FIG. 3 is an expanded view of the locking mechanism used in each half of the carry case.
FIG. 4 illustrates a top view of the locking mechanism of the carry case.
Figure 2:
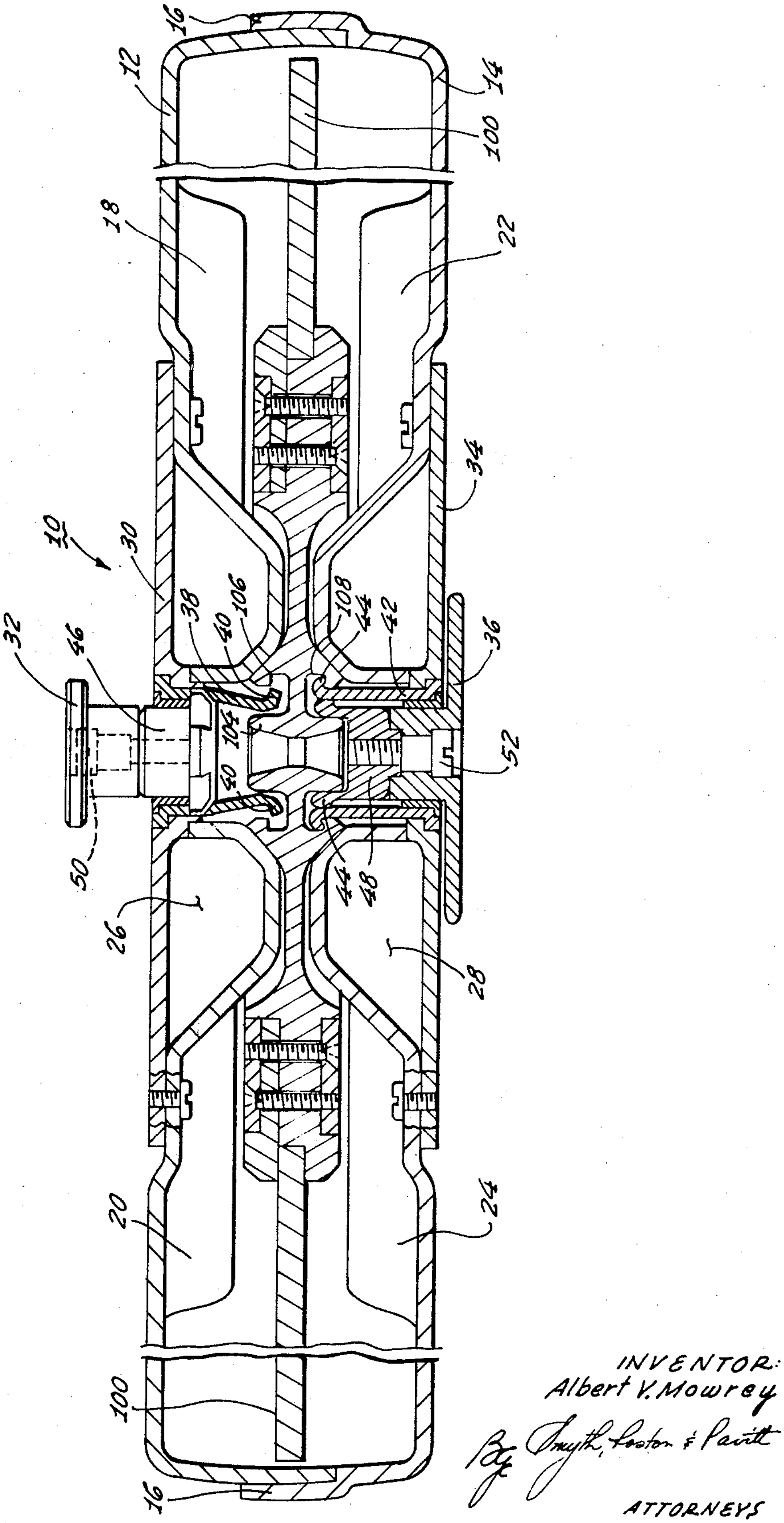
FIG. 2 illustrates a cross-sectional view of the carry case of the present invention showing the magnetic disc supported within the carry case.

In FIG. 1 the carry case 10 of the present invention includes a first cover member 12 and a second cover member 14. The cover members 12 and 14 overlap in an area 16 so that the cover members form an enclosed space. As shown in FIG. 1, the top cover member 12 includes recessed portions 18 and 20. It is to be appreciated that the bottom member 14 also includes recess portions which will be seen with reference to FIG. 2 and are specifically designated as recess portions 22 and 24. A further recess portion 26 shown in FIG. 1 and 2 is used for supporting the locking mechanism. A similar recess portion 28 in the bottom cover member is shown in FIG. 2.

Turning back to FIG. 1, a locking mechanism is generally shown and includes a handle 30 extending across the recessed portion 26 and attached to the top cover member 12. A locking arm 32 shown in its locked position is also illustrated in FIG. 1. In FIG. 2, the locking arm 32 is shown in its unlocked position. The bottom cover member 14 is also shown to support a second handle 34 and a locking arm 36.

In FIG. 2 it can be seen how a magnetic disc 100 is supported by a hub member 102 and with the hub member 102 supported between the cover members 12 and 14 to have the magnetic disc 100 fall floating within the enclosed space. The hub member 102 includes a double tapered section 104 which is used to align the magnetic disc on the drive spindle in a magnetic disc recorder and reproducer. The hub member 102 also includes a pair of circular grooves 106 and 108 which are to receive spring fingers for locking the hub member to either or both of the cover members 12 and 14.

The upper cover 12 includes a spring member 38 which has a plurality of spring fingers 40 for insertion in the circular groove 106. The lower cover member 14 includes a spring member 42 having a plurality of spring fingers 44 for insertion in the circular groove 108. The spring fingers 40 and 44 are activated into engagement in the grooves 106 and 108 using locking activators 46 and 48. Specifically, as the locking activators 46 and 48 are pushed toward the center of the carry case, the spring fingers 40 and 44 are moved outwardly to enter the grooves 106 and 108 so that the hub member 102 of the magnetic disc is locked to the top and bottom cover members 12 and 14 of the carry case 10. Bolt members 50 and 52 are used to couple the locking arms 32 and 36 with the locking activators 46 and 48.

It can be seen from the structure shown in FIG. 2 that either half of the carry case 10 may be unlocked with the hub member of the magnetic disc. For example, the locking arm 32 and the locking activator 46 are shown in an unlocked position so that the spring fingers 40 are not within the groove 106. The top cover 12 may therefore be removed but the magnetic disc is still locked to the bottom cover 14 since the spring fingers 44 are located within the groove 108. The cover portion 14 may therefore be used for inserting the magnetic disc on a drive spindle and when the magnetic disc has been so inserted, the arm 36 may be rotated so as to allow the locking activator 48 to be pulled upward so as to disengage the fingers 44 from the groove 108. The magnetic disc will then be left on the drive spindle for recording and reproduction. Either of the cover members 12 or 14 may therefore be used to insert the magnetic disc on the drive spindle so that both sides of the magnetic disc may be used for recording and reproduction in the magnetic disc recording and reproducing system.

In order to ensure that the locking arms 32 and 36 are not inadvertently pulled to unlock the hub member of the magnetic disc, the locking mechanisms include an interlock which will be seen in clearer detail with reference to FIGS. 3 and 4. FIG. 3 and FIG. 4 represent the locking mechanism in the top cover 12 but the locking mechanism in the bottom cover 14 is substantially identical. In FIG. 3 it can be seen that the handle 30 supports the spring member 38 and spring member 38 may actually be force-fitted within an opening in the handle 30. The locking fingers 40 may be seen to be separate spring fingers and the spring fingers normally have the position shown in FIG. 3. An interlocking ring member 54 is inserted within the member 38 and may be permanently affixed using appropriate means such as an epoxy. The interlocking ring 54 includes a slot 56. The locking arm 32 includes a pair of pins 58 and 60. The pin 58 cooperates with the slot 56 to provide for interlocking. In addition, the interlocking ring 54 includes a slot 62 to allow the pin 58 to be inserted through the ring 54 to the slot 56. The bolt member 50 extends through the locking arm 32 but the locking arm 32 is free to rotate on the smooth surface 64 of the bolt member 50. The bolt member 50, however, includes a threaded portion 66 which engages a threaded portion 68 in the locking actuator 46. The locking actuator 46 also includes a slot member 70 which receives the pin 60 to act as a guide.

It can be seen therefore with reference to FIGS. 3 and 4, that the locking arm 32 rotates on the shaft member formed by the smooth portion 64 of the bolt 50. However, the locking arm 32 and the locking actuator 36 are connected through the bolt 50. When the locking arm 32 is in the position shown in FIG. 3, the pin 58 may slide in the groove 62 so as to allow the locking actuator 64 to be moved toward the center of the carry case within the member 38 and to thereby force the locking fingers 40 outward to enter the locking slot 106 in the hub member 102 of the magnetic disc. When the locking arm 32 has been pushed completely in, the locking arm 32 may be rotated clockwise to the position shown in FIG. 4. At this time the pin 58 rides in the slot 56 and the pin 60 rides in the slot 60 so that the rotational movement of the locking arm 32 is controlled. The locking arm therefore can only rotate through 90° from the unlocked position shown in FIG. 3 to the locked position shown in FIG. 4.

The carry case of the present invention therefore provides for a structure for storing magnetic discs and wherein each half of the carry case may be used for inserting the magnetic disc on the drive spindle in a magnetic disc recorder. The carrying case includes a locking structure in each half and with such locking structure interrelating with a groove in a hub portion of the magnetic disc. The locking structure also includes an interlock so that the locking structure may not become accidentally unlocked. Although the invention has been described with reference to particular embodiments, the invention is only to be limited by the appended claims.

I claim:

1. A carry case for storing a magnetic disc and also for use as an insertion tool for inserting the magnetic disc on a center spindle in a magnetic disc recorder, wherein the magnetic disc includes a circular slot, including:

a pair of interconnecting cover members forming together an enclosed space for storing the magnetic disc and with the magnetic disc supported between portions of the cover members;

a locking mechanism located in at least one of the cover members and with such locking mechanism including a plurality of movable spring fingers for engagement with the circular slot in the magnetic disc for maintaining the magnetic disc with the one cover member to allow the one cover member to be used for inserting the magnetic disc on the center spindle in the magnetic recorder without touching the magnetic disc, and a locking actuator for moving the spring fingers into and out of engagement with the circular slot in the magnetic disc.

2. The carry case of claim 1 wherein the locking mechanism includes an interlock to prevent accidential opening of the locking mechanism.

3. A carry case for use with a magnetic disc as an inserting tool for positioning the magnetic disc on a center spindle in a magnetic disc recorder and wherein the magnetic disc has a central portion including at least one circular slot located around a central opening, including:

at least one cover member for receiving the magnetic disc and with the cover member including a central opening to provide access to the circular slot of the magnetic disc;

a locking member supported in the central opening of the cover member and including a plurality of spring fingers adjacent to but normally out of engagement with the circular slot of the magnetic disc;

a locking actuator supported within the central opening of the cover member and with the actuator having an unlocked position away from the magnetic disc and a locked position toward the magnetic disc and with the locking actuator in the locked position engaging the spring fingers and providing movement of the spring fingers into the circular slot of the magnetic disc, and a locking arm coupled to the locking actuator for providing movement of the locking actuator between the locked and unlocked positions.

4. The carry case of claim 1 additionally including a second cover member forming with the first cover member an enclosed space for receiving the magnetic disc for storage and including a locking mechanism member, locking actuator and locking arm for also locking the magnetic disc to the second cover member.

5. The carry case of claim 3 additionally including an interlock so as to prevent the accidental unlocking of the locking member when in the locked position.

6. The carry case of claim 3 wherein the cover member includes recessed portions for supporting the central portion of the magnetic disc.

7. A carry case for storing a magnetic disc and also for use as an insertion tool for inserting the magnetic disc on a center spindle in a magnetic disc recorder, wherein the magnetic disc includes a pair of locking apertures, including:

a pair of interconnecting cover members forming together an enclosed space for storing the magnetic disc and with the magnetic disc supported between portions of the cover members; and a pair of locking mechanisms one of which is located in each of the cover members and with each such locking mechanism including a movable locking member for engagement with one of the locking apertures in the magnetic disc for maintaining the magnetic disc with one or both of the cover members to allow a desired one of the cover members to be used for inserting the magnetic disc on the center spindle in the magnetic recorder without touching the magnetic disc.

* * * * *